(12) United States Patent
Augustinus

(10) Patent No.: US 7,522,626 B2
(45) Date of Patent: Apr. 21, 2009

(54) COMMUNICATIONS SYSTEM AND METHOD

(75) Inventor: Thomas Augustinus, Kolding (DK)

(73) Assignee: American Power Conversion Corporation, West Kingston, RI (US)

( * ) Notice: Subject to any disclaimer, the term of this patent is extended or adjusted under 35 U.S.C. 154(b) by 727 days.

(21) Appl. No.: 11/079,805

(22) Filed: Mar. 14, 2005

(65) Prior Publication Data

US 2006/0203834 A1  Sep. 14, 2006

(51) Int. Cl.
*H04L 12/28* (2006.01)
(52) U.S. Cl. .................................. 370/419; 370/423
(58) Field of Classification Search ................ None
See application file for complete search history.

(56) References Cited

U.S. PATENT DOCUMENTS

| | | | |
|---|---|---|---|
| 5,089,974 A | 2/1992 | Demeyer et al. | |
| 6,094,676 A | 7/2000 | Gray et al. | |
| 6,629,172 B1 * | 9/2003 | Andersson et al. | 710/104 |
| 6,772,232 B1 * | 8/2004 | Newell et al. | 710/9 |
| 6,803,678 B2 | 10/2004 | Gottlieb et al. | |
| 2003/0154285 A1 | 8/2003 | Berglund et al. | |
| 2006/0031488 A1 | 2/2006 | Swales | |

* cited by examiner

Primary Examiner—Wing F Chan
Assistant Examiner—Anthony Sol
(74) Attorney, Agent, or Firm—Lowrie, Lando & Anastasi, LLP

(57) ABSTRACT

Aspects of the invention are directed to communications systems and methods for communicating among a plurality of devices or modules. In one aspect a communications module for a communications system includes a first I/O to couple to a prior communications module in the communications system, a second I/O to couple to a next communications module in the communications system, a controller having an input and an output, a first circuit constructed and arranged to couple an incoming signal at the first I/O to the input of the controller, and to isolate an incoming signal at the first I/O from the output of the controller, and a second circuit constructed and arranged to couple an incoming signal at the second I/O to the input of the controller, and to isolate an incoming signal at the second I/O from the output of the controller.

22 Claims, 6 Drawing Sheets

COMMUNICATIONS SYSTEM AND METHOD

BACKGROUND OF INVENTION

1. Field of Invention

Embodiments of the invention relate generally to a communications system and method, and more particularly, specific embodiments are directed to a method and system for identifying individual modules or devices.

2. Discussion of Related Art

In a typical system that employs a communications bus to communicate between individual devices or modules of the system, it is necessary to assign addresses to the devices to allow each device to be identified by a master controller and/or other devices, so that messages and commands can be addressed to each device, and so that the source of messages and commands can be identified. In prior systems, a number of schemes exist for setting an identifier or address for each device. In one such prior art system, each module or device has a number of additional digital inputs in a communications bus connector that are used to set an address of the device. Each input can be set, for example, "high" or "low" to set an address for the device. One problem with such a system is that the number of digital inputs required increases as the number of devices in the system increases. For example, in a system having 32 devices, to provide a unique address for each device typically requires 5 digital inputs as the number of unique addresses is equal to $2^n$, where n is equal to the number of digital inputs. Another problem with this solution is that the procedure for setting each input high or low is to solder short circuits between appropriate pins of a mating connector. This process can be labor intensive and prone to errors.

In another known system, dipswitches or jumpers are used to set the address of each device in the system. This approach is simple and relatively inexpensive, but requires as many digital inputs as the system described above, and requires the manual setting of dipswitches or jumpers during an installation or manufacturing operation and can be prone to errors.

SUMMARY OF INVENTION

Embodiments of the invention provide systems and methods for communicating with devices over a network. A first aspect of the invention is directed to a communications module for a communications system. The communications module includes a first I/O to couple to a prior communications module in the communications system, a second I/O to couple to a next communications module in the communications system, a controller having an input and an output, a first circuit constructed and arranged to couple an incoming signal at the first I/O to the input of the controller, and to isolate an incoming signal at the first I/O from the output of the controller, and a second circuit constructed and arranged to couple an incoming signal at the second I/O to the input of the controller, and to isolate an incoming signal at the second I/O from the output of the controller.

In the communications module, the first circuit may be constructed and arranged to couple an output signal at the output of the controller to the first I/O and the second circuit may be constructed and arranged to couple the output signal to the second I/O. The first circuit may include a first diode coupled between the first I/O and the input of the controller and a second diode coupled between the first I/O and the output of the controller. The second circuit may include a third diode coupled between the second I/O and the input of the controller and a fourth diode coupled between the second I/O and the output of the controller. The controller may be configured to decode a first address signal received at the first I/O from the prior communications module to obtain an address of the communications module. The controller may be configured to send an acknowledgement signal through the first I/O after decoding the first address signal. Further, the controller may be configured to send a second address signal through the second I/O to provide an address to the next communications module. The controller may also be configured to detect a completion signal received at the second I/O and to send a completion signal through the first I/O to the prior communications module. The communications module may further include an optical isolation device coupled to a second output of the controller.

Another aspect of the invention is directed to a communications method for communicating among a plurality of devices, each of the devices having a first I/O to communicate with a prior device of the plurality of devices and a second I/O to communicate with a next device of the plurality of devices. The method includes receiving a first address signal at the first I/O of a first one of the plurality of devices, sending a first acknowledgment signal through the first I/O of the first one of the plurality of devices, and after sending the first acknowledgement signal sending a second address signal through the second I/O of the first one of the plurality of devices.

The method may include decoding the first address signal in the first one of the plurality of devices to obtain an address for the first one of the plurality of devices. The method may further include encoding the second address signal in the first one of the plurality of devices with an address for a second one of the plurality of devices. The method may include receiving at the first I/O of a last one of the plurality of devices a last address signal containing an address for the last one of the plurality of devices, decoding the last address signal to obtain the address for the last one of the plurality of devices, sending a completion signal through the first I/O of the last one of the plurality of devices, the completion signal being encoded to indicate that an addressing process is complete. The method may include receiving the completion signal at the second I/O of the first one of the plurality of devices, sending an acknowledgement signal through the second I/O of the first one of the plurality of devices, and sending the completion signal through the first I/O of the first one of the plurality of devices. In the method, sending a second address signal through the second I/O of the first one of the plurality of devices may include sending the second address signal until a second acknowledgement signal is received at the second I/O of the first one of the plurality of devices. In the method, before sending the completion signal, the method may include sending a next address signal through the second I/O of the last device for a period of time. Also, sending a second address signal through the second I/O of the first one of the plurality of devices may include sending the second address signal until a second acknowledgement signal is received at the second I/O of the first one of the plurality of devices. The method may further include sending the second address signal through the first I/O of the first one of the plurality of devices at substantially the same time that the second address signal is sent through the second I/O of the first one of the plurality of devices. Each of the plurality of devices may be coupled to a primary communications bus, and the method may further include setting an address of the first one of the plurality of devices for the primary communications bus to the first address.

Yet another aspect of the invention is directed to a system. The system includes a first communications bus, a second communications bus, a plurality of modules, each of the modules having a first communications circuit to communicate over the first communications bus and a second communications circuit to communicate over the second communications bus, and means, using the second communications bus, for establishing an address for each of the plurality of modules for communicating on the first communications bus.

In the system, the means for establishing an address may include a main controller coupled to each of the first communications bus and the second communications bus. The main controller may be configured to start an addressing procedure for the first communications bus by sending a first address signal to a first one of the plurality of modules over the second communications bus. The second communications circuit of the first one of the plurality of modules may include a first I/O coupled over the second communications bus to the main controller to receive the first address signal. The second communications circuit of the first one of the plurality of modules may include a second I/O coupled over the second communications bus to a second one of the plurality of modules, and the second communications circuit of the first one of the plurality of modules may be configured to send a second address signal over the second I/O to the second one of the plurality of modules after receipt of the first address signal. The second communications circuit of the first one of the plurality of modules may be configured to send the second address signal over the first I/O to the main controller. The second communications circuit of the first one of the plurality of modules may be configured to detect a completion signal from the second one of the plurality of modules at the second I/O, and may be configured to send a completion signal to the main controller over the first I/O. The first one of the plurality of modules may be configured to decode the first address signal to obtain a first address, and to set an address of the first communications bus for the first one of the plurality of modules to the first address. The second one of the plurality of modules may be configured to decode the second address signal to obtain a second address, and to set an address of the second communications bus for the second one of the plurality of modules to the second address.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
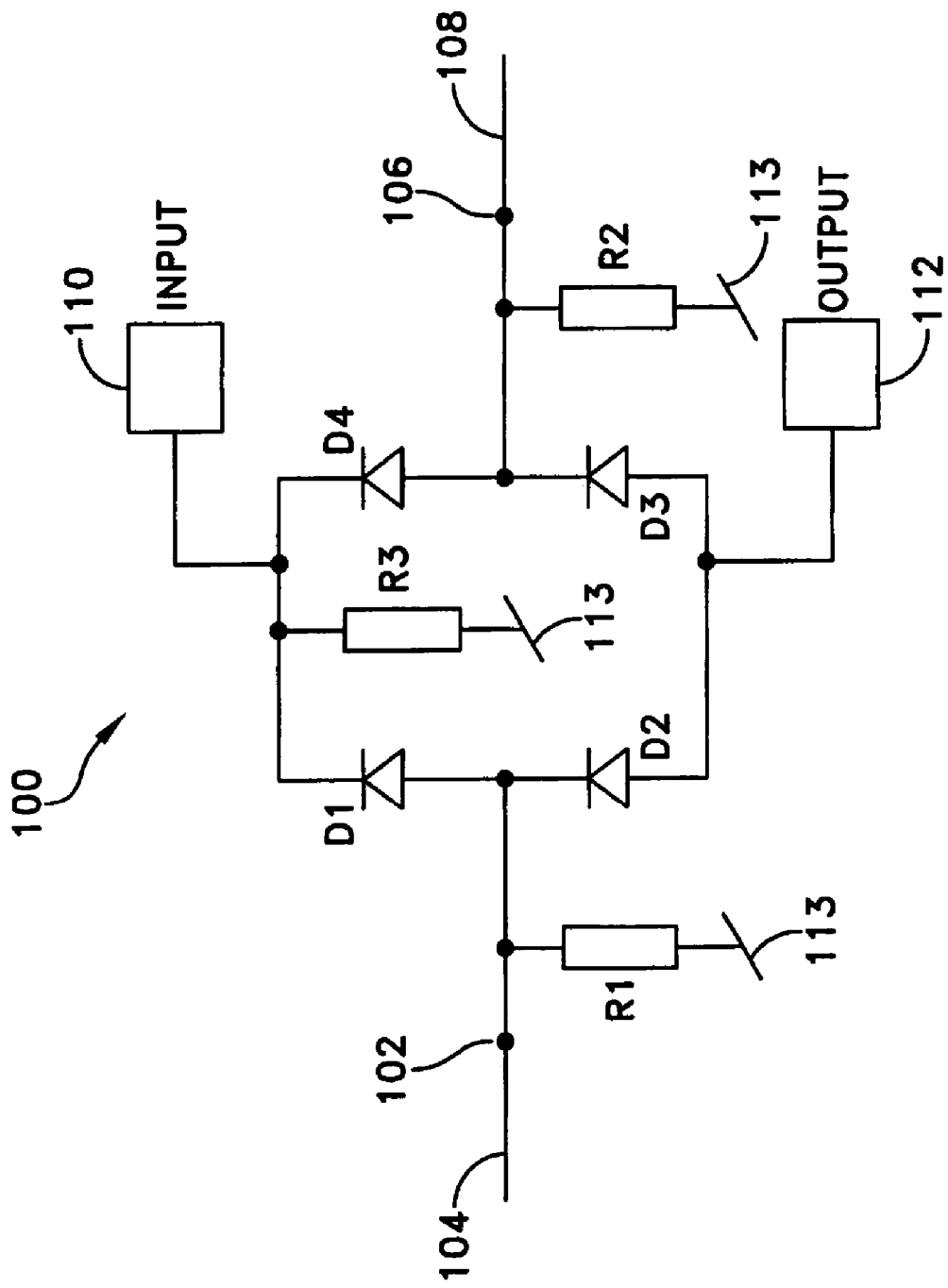
FIG. 1 is a schematic diagram of an addressing module in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Communications systems, devices and methods of embodiments of the present invention are described herein for use with systems that include multiple modules or devices to provide addressing of the modules or devices. In describing these systems, the terms modules or devices may be used interchangeably. In addition, systems and methods are not limited for use with systems that have discrete modules or devices, but may be used for addressing and/or signaling in other applications as well.

A communications module 100 in accordance with one embodiment that may be used with devices to allow communication between the devices and a master module, and more specifically, to provide addressing or numbering of the modules will now be described with reference to FIG. 1, which includes a schematic diagram of the communications module 100. In systems incorporating embodiments of the invention, one communications module 100 may be included in each module or device of the system. The communications module 100 includes an input/output (I/O) 102 to couple to a previous device through a communications line 104 (or a master device), an input/output (I/O) 106 to couple to a next device through a communications line 108, an input 110 to receive data from the communications lines and an output 112 to provide output data to the communications lines. The communications module also includes resistors R1, R2 and R3, and diodes D1, D2, D3 and D4. Each of the resistors has one end coupled to a signal reference point 113 of the communications module 100.

The communications module 100 operates by transmitting and/or receiving either "high" or "low" signals. In one embodiment a "high" signal has a voltage value of approximately 5 volts, while a "low" signal has a voltage value of approximately 0 volts, however, other voltage values can be used for the high and low signals. When a "high" signal is received from the previous module at I/O 102, diode D1 will be forward biased and pass the signal to the input 110, and diodes D2 and D4 are reverse biased, preventing the signal from passing from the input 102 directly to the output 112. In one embodiment, diodes having low forward voltage drops are used for D1, D2, D3 and D4, such as those available from Philips of the Netherlands under Part No. BAT54S, and R1, R2 and R3 are implemented using 10 kOhm resistors.

When a "high" signal is provided at the output 112, both diodes D2 and D3 are forward biased to provide the output "high" signal at both I/O's 102 and 106. Diodes D1 and D4 are also forward biased, so the output signal is also detected at the input. In one embodiment, described further below, both the input 110 and the output 112 may be coupled to a common microcontroller that controls the module 100 and provides a communication interface with a device containing the module. In this embodiment, the microcontroller can identify its own output signal at the input. When the communications module transmits a "low" signal, resistors R1 and R2 maintain the communications lines at the "low" voltage value. A system using multiple communications modules 100 implements a weak "low" signal and a strong "high" signal, allowing each communications module that transmits a "high" signal to overrule a "low" signal by a neighboring module. In the module shown in FIG. 1, diodes D1 and D2 form a first circuit that couples an incoming signal at I/O 102 to the input 110, while isolating the incoming signal at I/O 102 from the output 112, and diodes D3 and D4 form a second circuit that couple an incoming signal at I/O 106 to the input 110, while isolating the incoming signal at I/O 106 from the output 112.

Figure 2:
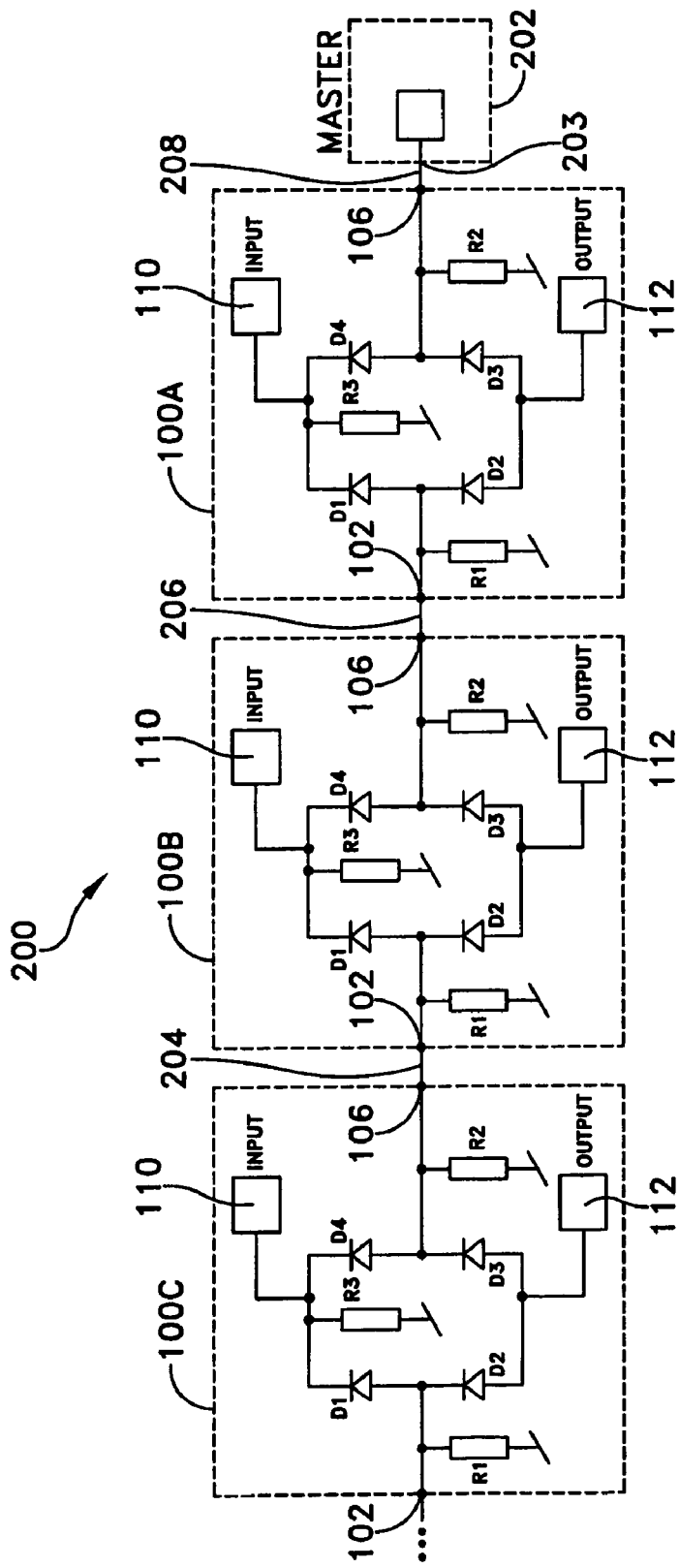
FIG. 2 is a schematic diagram of a communications system containing a plurality of the addressing modules of FIG. 1.

FIG. 2 shows a schematic diagram of a communications system 200 that includes a plurality of communications modules 100A, 100B and 100C, each of which is similar to communications module 100 discussed above, and common components are identified using the reference numbers of FIG. 1. The communications system also includes a master device 202 having an input/output port 203. The communications modules 100A, 100B, 100C and the master device 202 are coupled using communications lines 204, 206 and 208 in a daisy chain manner. Each of the communications modules 100A, 100B and 100C, may be located in a different device, module or subsystem, each of which communicate with the master device 202. The input 110 and the output 112 of each communications module may be coupled to a microcontroller that controls communications of the module.

Figure 3:
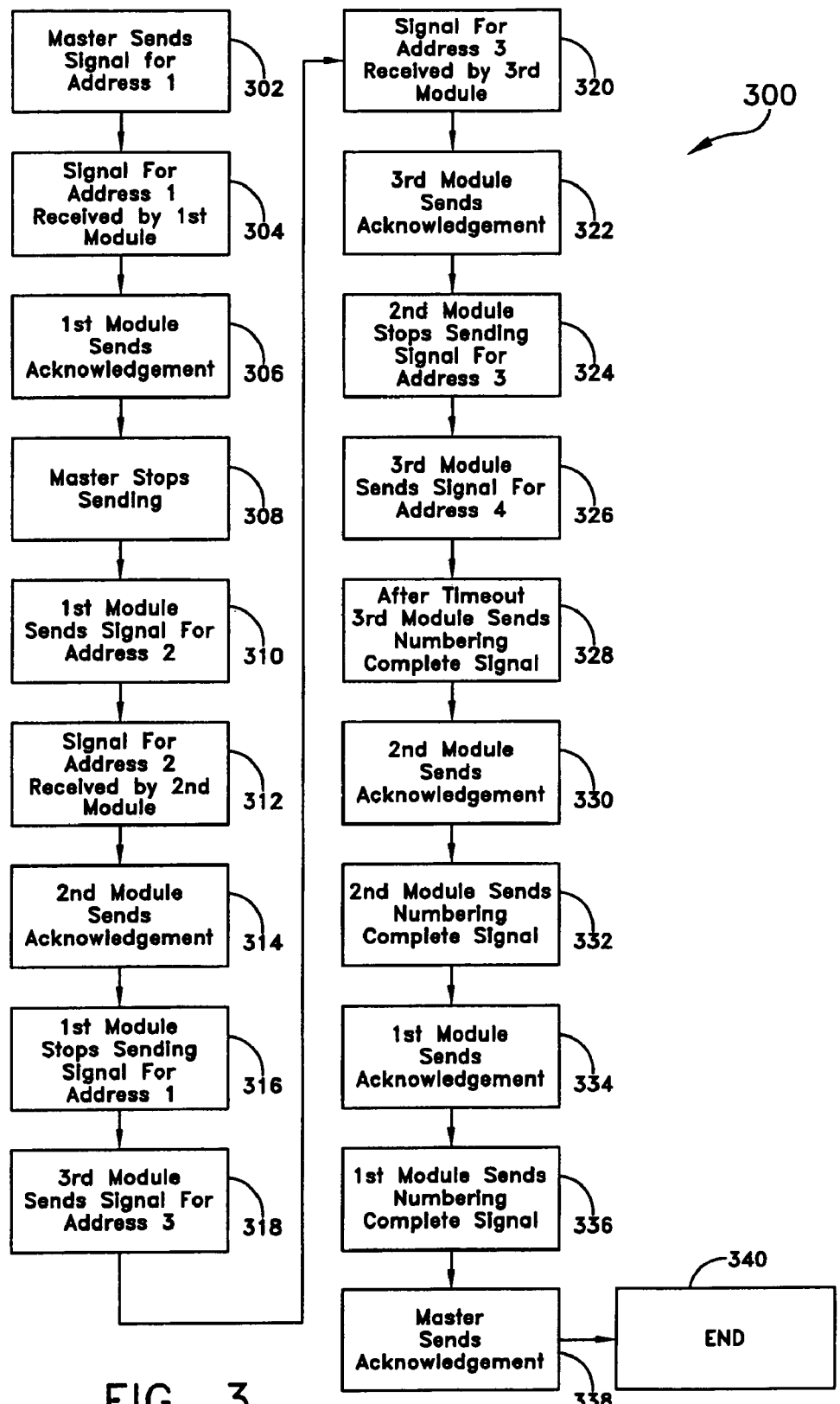
FIG. 3 is a flow chart of a process for providing numbering or addressing of a plurality of devices in accordance with one embodiment of the present invention.
Figure 4:
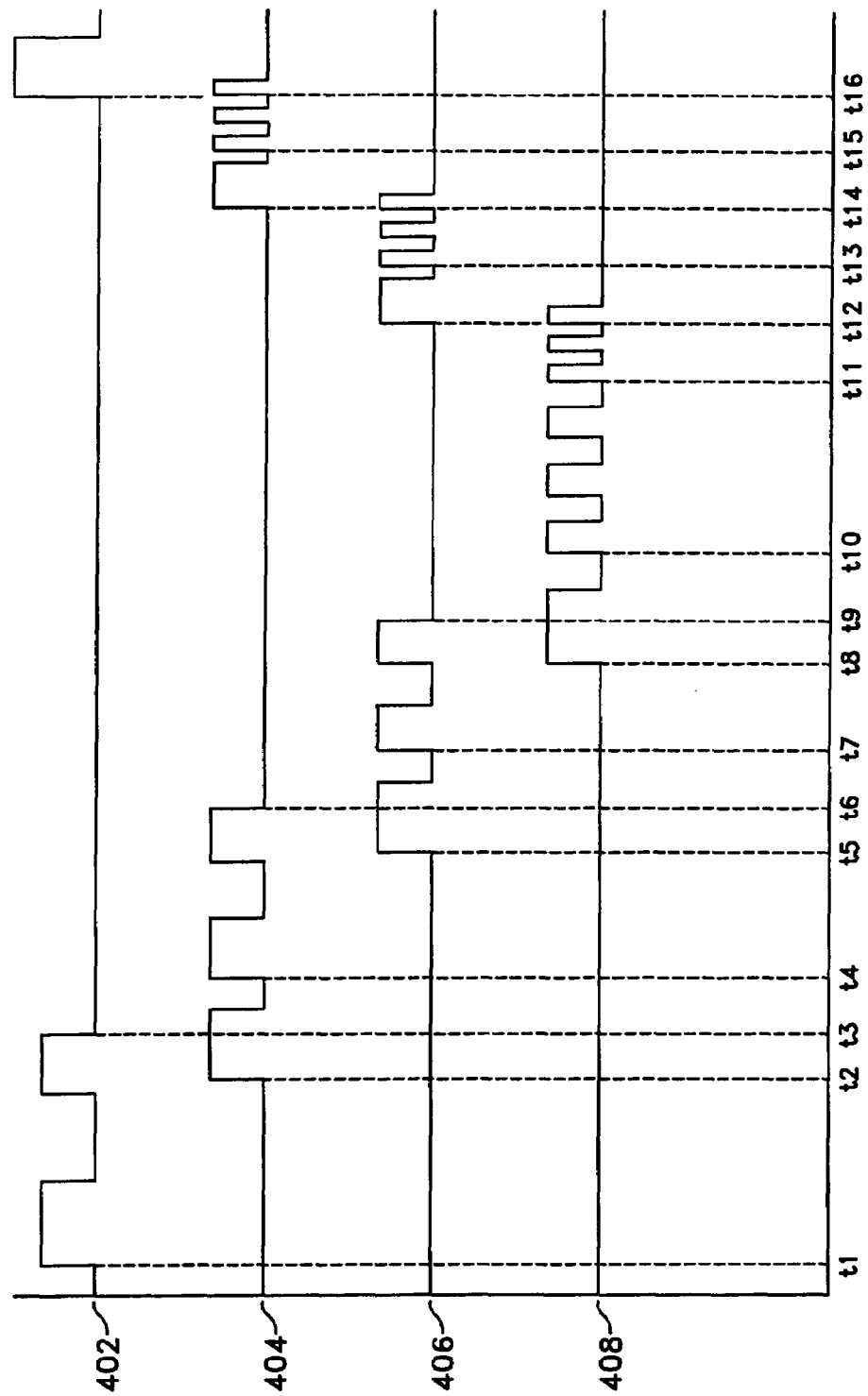
FIG. 4 is a timing diagram of signals used in one embodiment in the system of FIG. 2.

A process 300 for numbering or assigning addresses to each of the devices with which the communications modules 100A, 100B and 100C are associated will now be discussed with reference to FIG. 3, which shows a flow chart of the process, and with reference to FIG. 4, which shows a timing diagram of signals associated with the process 300.

In a first stage 302 of the process (at time t1, see FIG. 4), the master device 202 starts toggling its I/O 203 with an output signal 402 having a frequency, which corresponds to the number or address "1" in the system. At stage 304, the signal 402 is received by the first communications module 100A at I/O 106, and provided at input 110 to the microcontroller associated with the first communications module 100A where the microcontroller identifies the signal as address "1". At stage 306, at time t2 (see FIG. 4) the output 112 of the first communications module 100A is set "high" to indicate that the first communications module 100A has accepted the address "1". Signal 404 of FIG. 4 corresponds to the output signal of the first communications module 100A. The master device 202 detects signal 404 and at stage 308 (time t3) stops toggling its I/O.

At stage 310 (time t4), the first communications module 100A starts toggling its output with an output signal 404 having a frequency, which corresponds to the number or address "2" in the system. At stage 312, the signal 404 is received by the second communications module 100B at I/O 106, and provided at input 110 to the microcontroller associated with the second communications module 100B where the microcontroller identifies the signal as address "2". At stage 314, at time t5 (see FIG. 4) the output 112 of the second communications module 100B is set "high" to indicate that the second communications module 100B has accepted the address "2". Signal 406 of FIG. 4 corresponds to the output signal of the second communications module 100B. The first communications module detects signal 406 and at stage 316 (time t6) stops toggling its I/O.

At stage 318 (time t7), the second communications module 100B starts toggling its output with an output signal 406 having a frequency, which corresponds to the number or address "3" in the system. At stage 320, the signal 406 is received by the third communications module 100C at I/O 106, and provided at input 110 to the microcontroller associated with the third communications module 100C where the microcontroller identifies the signal as address "3". At stage 322, at time t8 (see FIG. 4) the output 112 of the third communications module 100C is set "high" to indicate that the third communications module 100C has accepted the address "3". Signal 408 of FIG. 4 corresponds to the output signal of the third communications module 100C. The second communications module detects signal 408 and at stage 324 (time t9) stops toggling its I/O.

Next, at stage 326 (time t10), the third communications module 100C starts toggling its output with an output signal 408 having a frequency, which corresponds to the number or address "4" in the system. In the system 200, the third communication module is the last module, and accordingly, the third communications module will not receive a receipt signal from a next module. After a predetermined time, at stage 328 (time t11), the microcontroller of the third communications module determines that it is the final module, and adjusts the frequency of its output signal to a frequency that corresponds to "numbering complete." At stage 330, the numbering complete signal is received by the second communications module and a "high" confirmation signal is sent (time t12) to the third communications module to cause the third communications module to stop sending the numbering complete signal. At stage 332 (time t13), the second communications module sends the numbering complete frequency. The first communications module indicates receipt of the numbering complete signal (stage 334, time t14), and sends the numbering complete signal to the master device (stage 336, time t15). The master device acknowledges receipt of the numbering complete signal (stage 338, time t16), and the numbering process is complete at stage 340.

Figure 5:
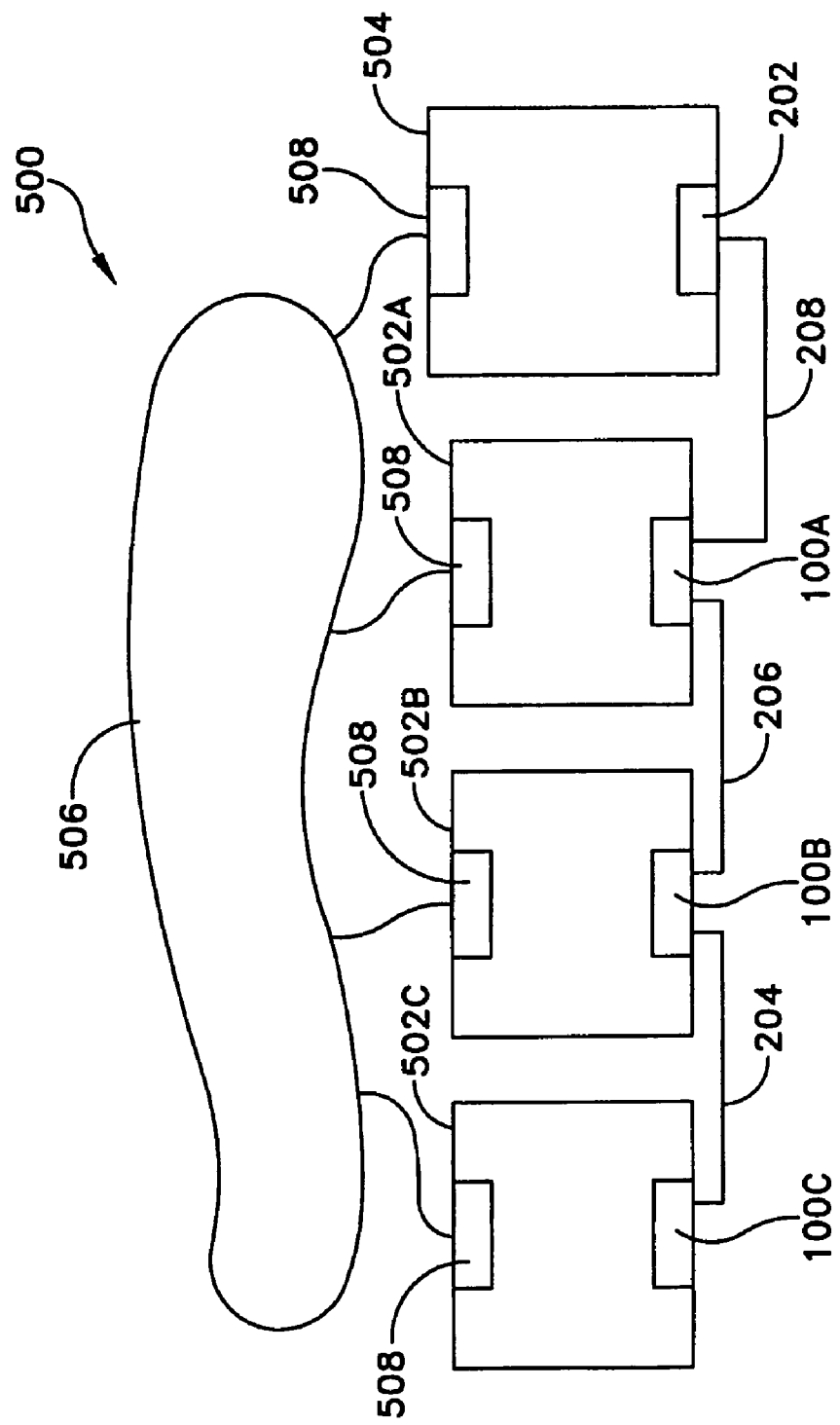
FIG. 5 is a block diagram of a system incorporating a plurality of subsystems that communicate using the communications system of FIG. 2.

In one embodiment, which will now be described with reference to FIG. 5, the numbering process and communications modules discussed above, may be used in a system 500. The system 500 includes three subsystems 502A, 502B and 502C along with a system controller 504. The system 500 includes the communications system 200 discussed above with the communications modules 100A, 100B and 100C contained in one of the subsystems 502A, 502B and 502B and the master device 202 contained within the system controller 504. The communications modules and the master device are coupled together using communications lines 204, 206 and 208 as discussed above. In addition, the subsystems and the system controller are coupled together using a communications network 506 that includes a network interface module 508 contained in each of the subsystems and in the system controller.

In the system 500, the numbering process described above is used in an initialization process of the system to provide a network address for each of the three subsystems 502A, 502B and 502C. The network address is then used by the system controller 504 to communicate with each of the subsystems using the network 506. The network 506 may be implemented using a CAN bus in accordance with ISO 11898/11519, or in other embodiments, may be implemented using other types of networks such as an I2C network.

In one embodiment, the system 500 is a modular uninterruptible power supply (UPS), such as those available from American Power Conversion Corporation of West Kingston, R.I., including the Symmetra® line of uninterruptible power supplies. In this embodiment, the master controller 504 may be the primary controller of the UPS, and each of the subsystems may be power modules, may be battery modules, or a combination of battery modules and power modules.

Figure 6:
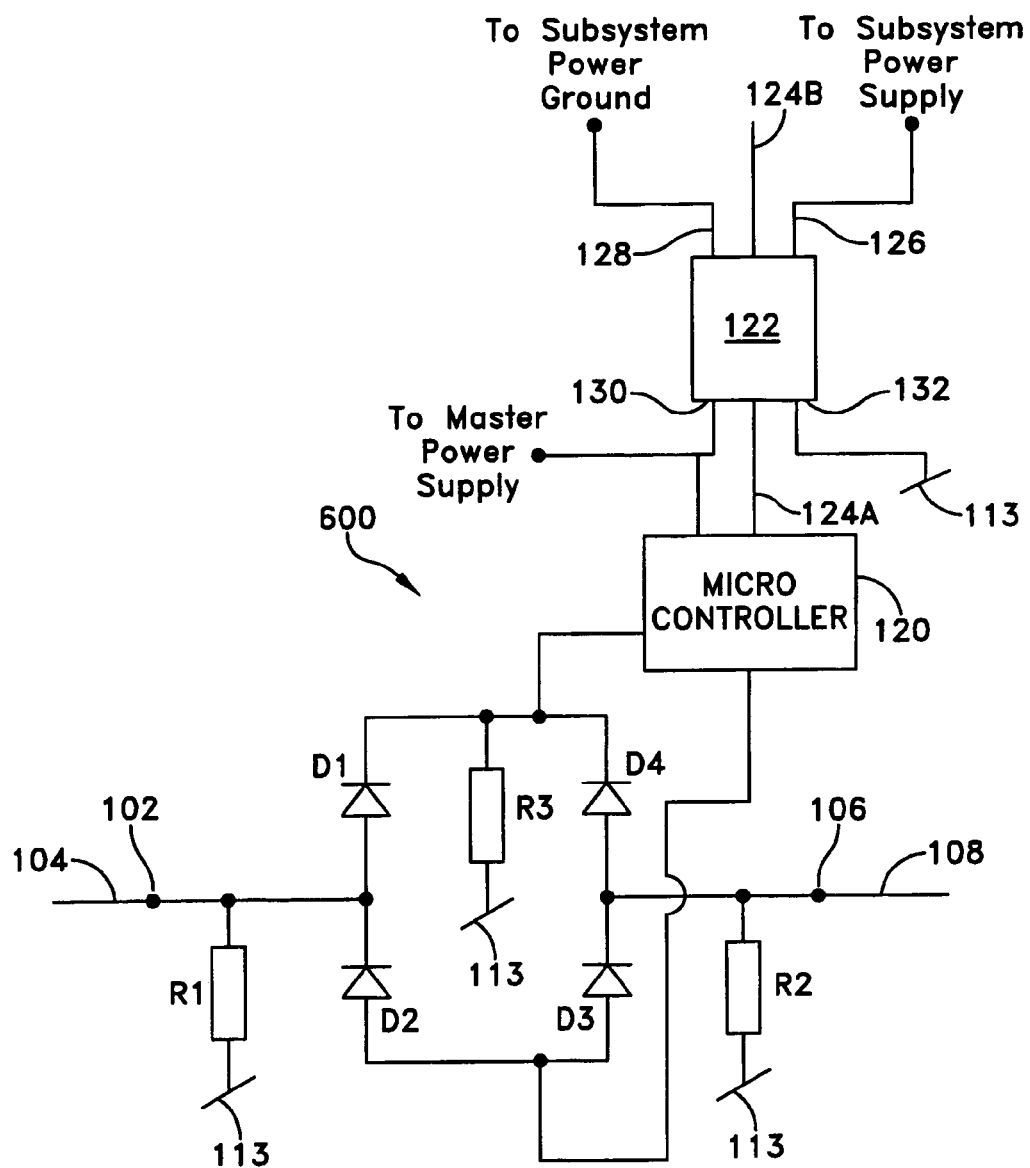
FIG. 6 is a schematic diagram of an addressing module in accordance with another embodiment of the invention.

An additional embodiment of a communications module 600 that may be used in communications systems of embodiments of the invention will now be described with reference to FIG. 6. Communications module 600 is similar in many aspects to communications module 100 discussed above, and like elements have the same reference numbers. Communications module 600 includes diodes D1, D2, D3 and D4 and resistors R1, R2, and R3, all connected in the same manner as described above for communications module 100. In addition, communications module 600 includes a microcontroller 120 that has pins that function as the input 110 and the output 112. The communications module 600 also includes an optical coupler 122 coupled on an output data line 124A of the microcontroller that provides data, for example, subsystem address data to a host subsystem, such as one of subsystems 502A, 502B and 502C described above. The optical coupler has an output data line 124B that provides the data from the microcontroller.

The optical coupler includes a first power input 126 and first power ground 128 and a second power input 130 and second power ground 132. In one embodiment, the first power input and the first power ground are coupled to a power supply of a subsystem containing the communications module 600, while the second power input is coupled to a power supply of the master device and the second power ground is coupled to the signal reference point 113 of the communications module 600. Power for the microcontroller may also be provided by the power supply of the master device. In one embodiment, the optical coupler may be implemented using a device available from Agilent of Palo Alto, Calif. under part no. HCPL7710#300 and the microcontroller may be implemented using a device available from Microchip of Chandler, Ariz. under part no. PIC12C509, however, other devices may be used as well. The optical coupler 122 provides galvanic isolation between a communications modules 600 and its host system.

With the microcontroller 120 in the communications module 600 coupled to and powered by the power supply of the master device, all power for the communications module 600 is supplied by the master device with galvanic isolation provided by optical coupler 122 between the communications module 600 and a subsystem coupled to the communications module. The communications module 600 provides an added advantage of allowing a numbering or addressing process to occur even while power is not provided to a subsystem containing the communications module. In other embodiments, rather than use power from the master device, the communications module 600 may include a small isolated dc/dc converter to provide power to the microcontroller and the isolated portion of the optical coupler. In one embodiment, a power converter available under part no. DUP75-0S05 from Astrodyne of Taunton, Mass. may be used.

In embodiments of the invention, when one subsystem (either 502A, 502B or 502C) is removed from the system 500, the communications link may be broken. To reconnect the link, the two I/O cables for the removed subsystem may be coupled together. In another embodiment, to ensure that the numbering scheme is maintained, a dummy module may be inserted in place of the removed subsystem. The dummy module may include one of the modules 100 or 600 discussed above. When the module 100 is used as the dummy module, a microcontroller may be included with the module 100. When the communications module 600 is used as the dummy module, no additional components are required as it contains a microcontroller and receives power from the master device.

In embodiments of the invention discussed above, the communications modules 100 and 600 are described as being located within a subsystem. In other embodiments, the communications modules may be stand-alone modules that connect to each subsystem and may be mounted for example on a system backplane or in other locations of the system.

In embodiments described above, the frequency of a communications signal is used to identify an address or number. In other embodiments, pulse width modulation could be used to identify addresses. The use of frequency and or pulse width to identify addresses provides simple decoding by the microcontroller of each communications module. However, in other embodiments, other modulation and signaling schemes could be used.

In the process 300 described above, once the numbering is complete, the third communications module sends a signal back to the second communications module to indicate that the numbering is complete. In other embodiments, the third communications module may use a primary communications bus, such as communications network 506 of system 500 to communicate to the master device that the numbering scheme is complete. In this embodiment, the final communications module in the chain can communicate to the master device the total number of subsystems that exist in the system.

In embodiments of the present invention, communications modules are described as containing microcontrollers and/or interfacing with microcontrollers that encode and decode signals of the communications modules. In other embodiments, devices other than microcontrollers can be used for these functions including logic circuits, ASICS, and microprocessors.

In descriptions of embodiments of the invention provided above, circuit elements are described as being coupled together. In different embodiments, the coupling may be achieved using electrical conductors, optical devices or in other ways to achieve functions of the invention. Further, while specific circuit devices, such as diodes and resistors, are used to implement particular functions within embodiments of the invention, other electronic devices, as known to those skilled in the art, such as transistors, may be used in place of the diodes and resistors to achieve functionality of circuits described above.

Communications systems of embodiments of the present invention provide several advantages, including the provision of bi-directional communication using only one input and one output for each communications module. Further, the use of frequency and/or pulse width modulation for signaling schemes allows a simple state machine, implemented in a low-cost microcontroller to be used to decode addresses in the communications systems.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A communications module for a communications system, the communications module comprising:
   a first I/O to couple to a prior communications module in the communications system;
   a second I/O to couple to a next communications module in the communications system;
   a controller having an input and an output;
   a first circuit constructed and arranged to couple an incoming signal at the first I/O to the input of the controller, and to isolate an incoming signal at the first I/O from the output of the controller; and
   a second circuit constructed and arranged to couple an incoming signal at the second I/O to the input of the controller, and to isolate an incoming signal at the second I/O from the output of the controller;

wherein the first circuit includes a first diode coupled between the first I/O and the input of the controller and a second diode coupled between the first I/O and the output of the controller.

2. The communications module of claim 1, wherein the first circuit is constructed and arranged to couple an output signal at the output of the controller to the first I/O and the second circuit is constructed and arranged to couple the output signal to the second I/O.

3. The communications module of claim 1, wherein the second circuit includes a third diode coupled between the second I/O and the input of the controller and a fourth diode coupled between the second I/O and the output of the controller.

4. The communications module of claim 1, wherein the controller is configured to decode a first address signal received at the first I/O from the prior communications module to obtain an address of the communications module.

5. The communications module of claim 4, wherein the controller is configured to send an acknowledgement signal through the first I/O after decoding the first address signal.

6. The communications module of claim 5, wherein the controller is configured to send a second address signal through the second I/O to provide an address to the next communications module.

7. The communications module of claim 6, wherein the controller is configured to detect a completion signal received at the second I/O and to send a completion signal through the first I/O to the prior communications module.

8. The communications module of claim 6, further comprising an optical isolation device coupled to a second output of the controller and constructed and arranged to provide output data from the controller and provide galvanic isolation between the controller and another subsystem.

9. The communications module of claim 6, wherein the first circuit is constructed and arranged to couple an output signal at the output of the controller to the first I/O and the second circuit is constructed and arranged to couple the output signal to the second I/O.

10. A communications module for a communications system, the communications module comprising:
   a first I/O to couple to a prior communications module in the communications system;
   a second I/O to couple to a next communications module in the communications system;
   a controller having an input and an output;
   a first circuit constructed and arranged to couple an incoming signal at the first I/O to the input of the controller, and to isolate an incoming signal at the first I/O from the output of the controller;
   a second circuit constructed and arranged to couple an incoming signal at the second I/O to the input of the controller, and to isolate an incoming signal at the second I/O from the output of the controller; and
   an optical isolation device coupled to a second output of the controller and constructed and arranged to provide output data from the controller and provide galvanic isolation between the controller and another subsystem.

11. A communications method for communicating among a plurality of devices, each of the devices having a first I/O to communicate with a prior device of the plurality of devices and a second I/O to communicate with a next device of the plurality of devices, the method comprising:
   receiving a first address signal at the first I/O of a first one of the plurality of devices;
   sending a first acknowledgment signal through the first I/O of the first one of the plurality of devices;
   after sending the first acknowledgement signal, sending a second address signal through the second I/O of the first one of the plurality of devices;
   decoding the first address signal in the first one of the plurality of devices to obtain an address for the first one of the plurality of devices;
   receiving at the first I/O of a last one of the plurality of devices a last address signal containing an address for the last one of the plurality of devices;
   decoding the last address signal to obtain the address for the last one of the plurality of devices;
   sending a completion signal through the first I/O of the last one of the plurality of devices, the completion signal being encoded to indicate that an addressing process is complete; and
   receiving the completion signal at the second I/O of the first one of the plurality of devices;
   sending an acknowledgement signal through the second I/O of the first one of the plurality of devices; and
   sending the completion signal through the first I/O of the first one of the plurality of devices.

12. The method of claim 11, further comprising encoding the second address signal in the first one of the plurality of devices with an address for a second one of the plurality of devices.

13. The method of claim 11, wherein sending a second address signal through the second I/O of the first one of the plurality of devices includes sending the second address signal until a second acknowledgement signal is received at the second I/O of the first one of the plurality of devices.

14. A communications method for communicating among a plurality of devices, each of the devices having a first I/O to communicate with a prior device of the plurality of devices and a second I/O to communicate with a next device of the plurality of devices, the method comprising:
   receiving a first address signal at the first I/O of a first one of the plurality of devices;
   sending a first acknowledgment signal through the first I/O of the first one of the plurality of devices;
   after sending the first acknowledgement signal, sending a second address signal through the second I/O of the first one of the plurality of devices;
   decoding the first address signal in the first one of the plurality of devices to obtain an address for the first one of the plurality of devices;
   receiving at the first I/O of a last one of the plurality of devices a last address signal containing an address for the last one of the plurality of devices;
   decoding the last address signal to obtain the address for the last one of the plurality of devices;
   sending a completion signal through the first I/O of the last one of the plurality of devices, the completion signal being encoded to indicate that an addressing process is complete; and
   before sending the completion signal, sending a next address signal through the second I/O of the last device for a period of time.

15. The method of claim 14, further comprising: receiving a completion signal at the second I/O of the first one of the plurality of devices; sending an acknowledgement signal through the second I/O of the first one of the plurality of devices; and
   sending a completion signal through the first I/O of the first one of the plurality of devices.

16. The method of claim 14, wherein sending a second address signal through the second I/O of the first one of the plurality of devices includes sending the second address signal until a second acknowledgement signal is received at the second I/O of the first one of the plurality of devices.

17. The method of claim 14, further comprising sending the second address signal through the first I/O of the first one of the plurality of devices when the second address signal is sent through the second I/O of the first one of the plurality of devices.

18. The method of claim 14, wherein each of the plurality of devices are coupled to a primary communications bus, and wherein the method further includes setting an address of the first one of the plurality of devices for the primary communications bus to the first address.

19. A system comprising:
a first communications bus;
a second communications bus;
a plurality of modules, each of the modules having a first communications circuit to communicate over the first communications bus and a second communications circuit to communicate over the second communications bus; and
means, using the second communications bus, for establishing an address for each of the plurality of modules for communicating on the first communications bus
wherein the means for establishing an address include a main controller coupled to each of the first communications bus and the second communications bus
wherein the main controller is configured to start an addressing procedure to set addresses for the first communications bus by sending a first address signal to a first one of the plurality of modules over the second communications bus;
wherein the second communications circuit of the first one of the plurality of modules includes a first I/O coupled over the second communications bus to the main controller to receive the first address signal;
wherein the second communications circuit of the first one of the plurality of modules includes a second I/O coupled over the second communications bus to a second one of the plurality of modules, and wherein the second communications circuit of the first one of the plurality of modules is configured to send a second address signal over the second I/O to the second one of the plurality of modules after receipt of the first address signal; and
wherein the second communications circuit of the first one of the plurality of modules is configured to detect a completion signal from the second one of the plurality of modules at the second I/O, and is configured to send a completion signal to the main controller over the first I/O.

20. The system of claim 19, wherein the second communications circuit of the first one of the plurality of modules is configured to send the second address signal over the first I/O to the main controller.

21. The system of claim 20, wherein the second one of the plurality of modules is configured to decode the second address signal to obtain a second address, and to set an address of the second communications bus for the second one of the plurality of modules to the second address.

22. The system of claim 19, wherein the first one of the plurality of modules is configured to decode the first address signal to obtain a first address, and to set an address of the first communications bus for the first one of the plurality of modules to the first address.

* * * * *